T. E. MURRAY & A. V. A. McHARG.
MULTIDUCT.
APPLICATION FILED APR. 30, 1913.

1,132,676.

Patented Mar. 23, 1915.
2 SHEETS—SHEET 1.

Witnesses:
Gertrude Porter
May T. McLarry

Inventors
Thomas E. Murray
Arthur V. A. McHarg
By their Attorney

T. E. MURRAY & A. V. A. McHARG.
MULTIDUCT.
APPLICATION FILED APR. 30, 1913.
1,132,676.
Patented Mar. 23, 1915.
2 SHEETS—SHEET 2
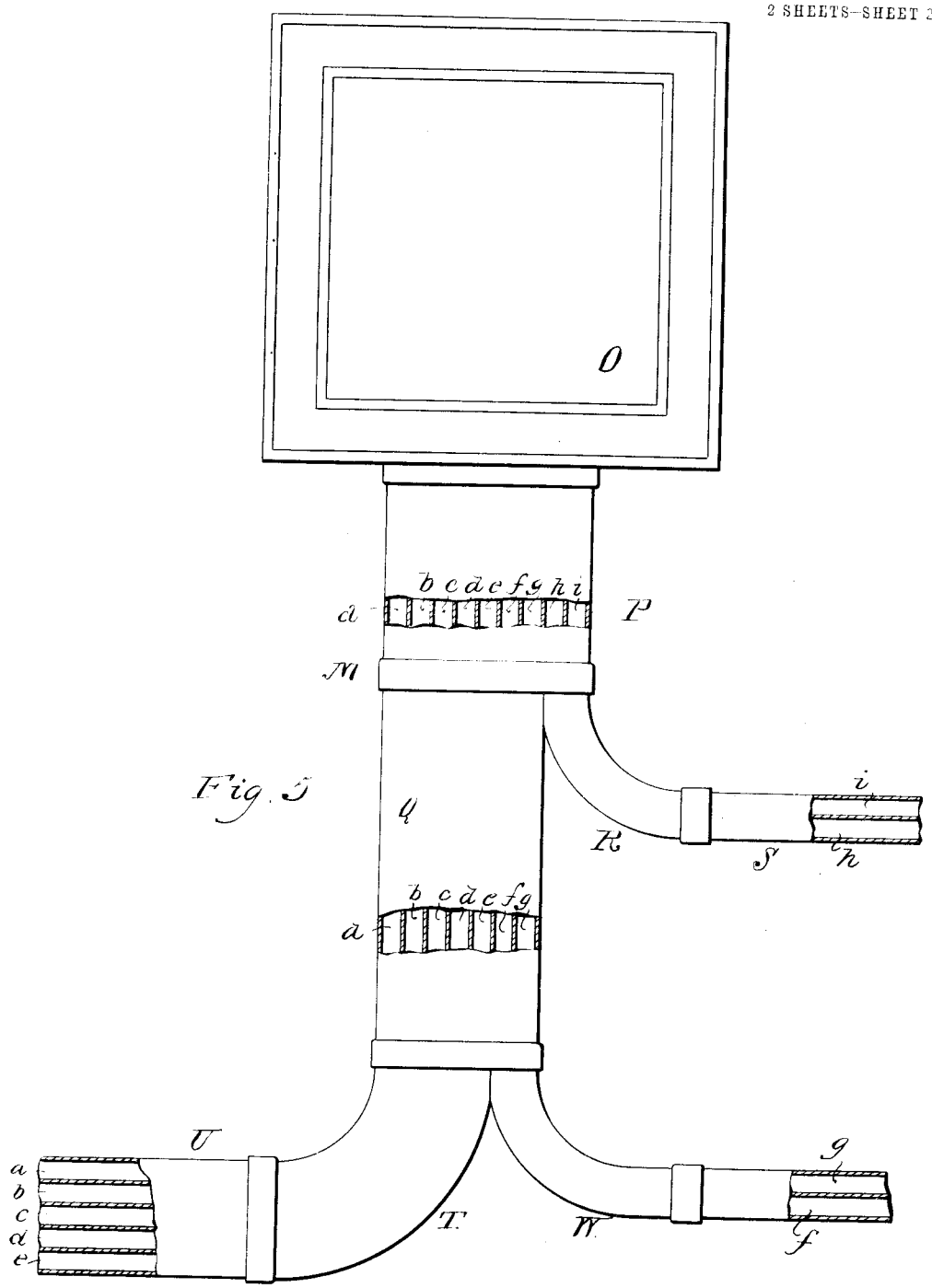

UNITED STATES PATENT OFFICE.

THOMAS E. MURRAY AND ARTHUR V. A. McHARG, OF NEW YORK, N. Y.; SAID McHARG ASSIGNOR TO SAID MURRAY.

MULTIDUCT.

1,132,676.   Specification of Letters Patent.   Patented Mar. 23, 1915.

Application filed April 30, 1913. Serial No. 764,531.

*To all whom it may concern:*

Be it known that we, THOMAS E. MURRAY and ARTHUR V. A. McHARG, citizens of the United States, residing at New York, in the county of New York and State of New York, have invented a certain new and useful Improvement in Multiducts, of which the following is a specification.

The invention is a multiduct for electrical conductors. Hitherto said ducts have been pipes or conduits, each connected to the panel box or other center of distribution, and each cut, fitted and installed separately, and, where needed, each bent separately.

Our present invention provides a multiduct in which the conduits are produced in groups of any desired number, and in such a way that, from the main multiduct, branch groups may be taken off, each containing any desired fractional number of conduits.

The multiduct is formed of a tube preferably of sheet metal, containing a sheet metal crenelated plate which divides the entire interior of the tube into a number of parallel conduits. The tube may be made sufficiently large to receive a plurality of such crenelated plates superposed one upon the other. No cement or other plastic material is used in the construction, and the multiduct therefore may be bent or turned in any direction. It may be constructed with branches by uniting the ends of the latter to the end of a main section, so that the several compartments register, all as more fully hereinafter described.

Figure 1:
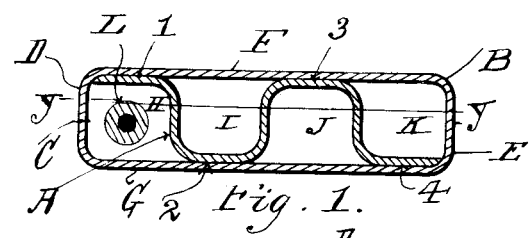
Figure 3:
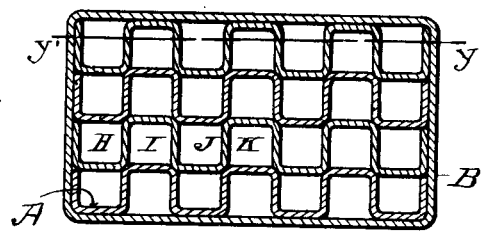
Figure 2:
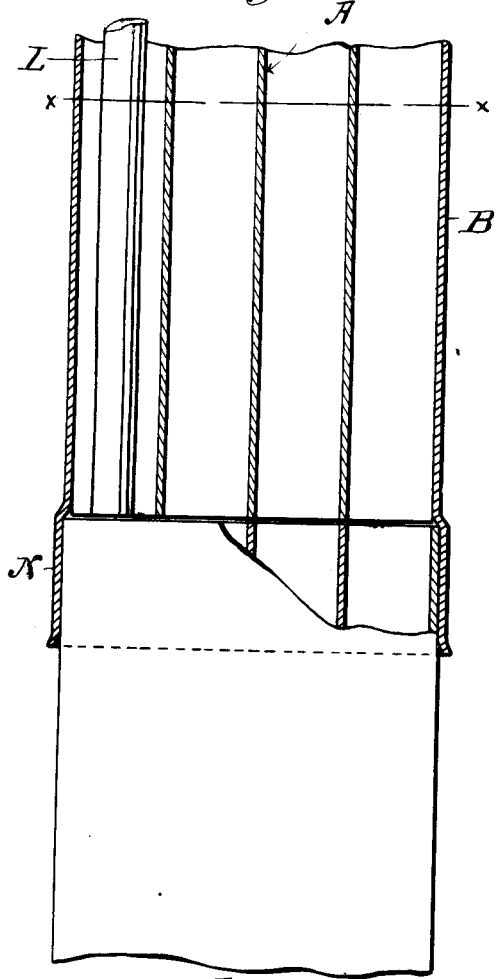
Figure 4:
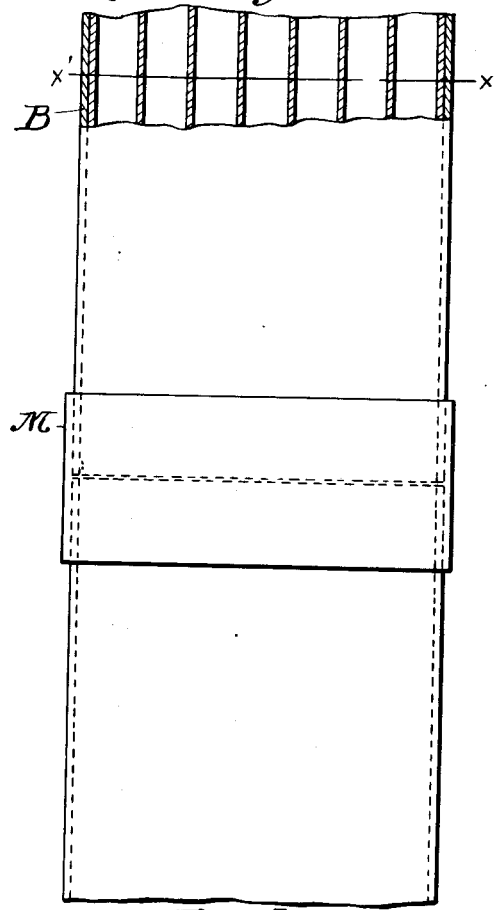

In the accompanying drawings—Figure 1 is a cross section of our multiduct on the line $x, x$ of Fig. 2. Fig. 2 is in part a section on the line $y, y$ of Fig. 1. Fig. 3 is a section similar to Fig. 1 on the line $x', x'$, of Fig. 4, showing a number of tiers of ducts. Fig. 4 is a section on the line $y', y'$ of Fig. 3. Fig. 5 shows how a main multiduct may be divided into branch multiducts, each containing a desired number of conduits.

Similar numbers and letters of reference indicate like parts.

A is an elongated plate of sheet metal of crenelated shape in cross section, and having the outer surfaces of alternate bends, as 1, 3, or 2, 4 in the same plane. B is a tubular shell of sheet metal caused to inclose said plate A by bending the same around said plate, and welding the edges at any convenient point, as C. As here shown, the plate A abuts against the opposite walls D, E of shell B, and its bends 1, 3 make contact with wall F and its bends 2, 4 with wall G. In this way, the space within the shell becomes divided into parallel compartments, as H, I, J, K, in Fig. 1, which may be multiplied both by augmenting the crenelations in the plate, and by employing a number of such plates placed one upon the other, as shown in Figs. 3 and 4, so that the bottom walls of one plate close the compartments in the plate next below. In such case, the inclosing shell B extends around all the plates A. Each compartment forms a conduit for a cable or conductor placed therein, as indicated at L, Figs. 1 and 2.

The multiduct may be made in sections of any convenient length connected end to end by a strap M, Fig. 4, which covers the joint and may be soldered or welded to the abutting shells B, or by enlarging the end portion N of the shell of one section, to receive the extremity of the adjacent section, as shown in Fig. 2, the enlarged portion N then being soldered or welded to the said extremity.

In Fig. 5 we show how our multiduct may be divided to separate two or more individual conduits and to provide for different directions of lead. O represents a panelboard box, with which the main multiduct P communicates. Said multiduct P has here nine conduits, $a, b, c, d, e, f, g, h, i$. In order to take off two conduits, as $h, i$, we connect to the end of main multiduct P by a strap M, a straight multiduct Q having seven conduits, and a curved multiduct R having two conduits. To the end of multiduct R a straight multiduct S is connected by a strap similar to M, and leads in whatever direction may be desired. In like manner, the multiduct Q may be divided so that two conduits $f, g$ are led off, as shown at W, and the remaining multiduct of five conduits $a, b, c, d, e$ may be curved, as shown at T, and connected to a straight multiduct U. Of course, any separation of groups of individual conduits may be effected in this way.

The multiduct thus made is simple, cheap, of minimum weight, occupies much less room than ordinary single pipes, and is more sightly. All of the conduits in each multiduct or branch are cut, fitted and installed together, and if in the bent or curved sections they may all be bent together in the factory, before installation.

We claim:

A multiduct, consisting of a substantially rigid tube of sheet metal polygonal in cross section, and a plurality of superposed longitudinally crenelated plates of sheet metal therein, the crenelations of each of said plates entering the recesses between the crenelations of adjacent plates, and the said plates coöperating with one another and with the walls of said tube to divide the entire space within said tube into a plurality of groups of parallel compartments.

In testimony whereof we have affixed our signatures in presence of two witnesses.

THOMAS E. MURRAY.
ARTHUR V. A. McHARG.

Witnesses:
GERTRUDE T. PORTER,
MAY T. McGARRY.